June 17, 1930.  H. M. A. STRAUSS  1,764,908
WAFFLE IRON
Filed July 18, 1929  2 Sheets-Sheet 1
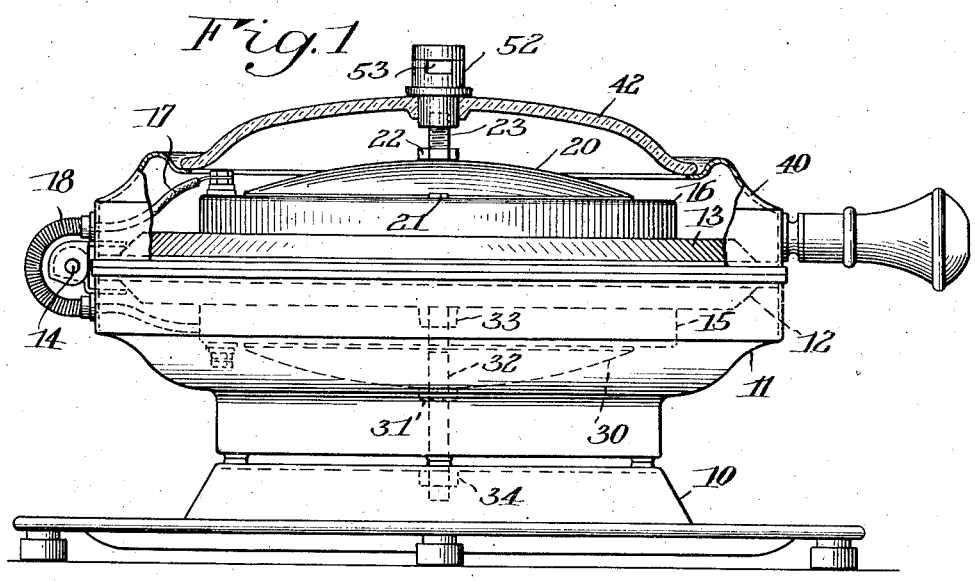
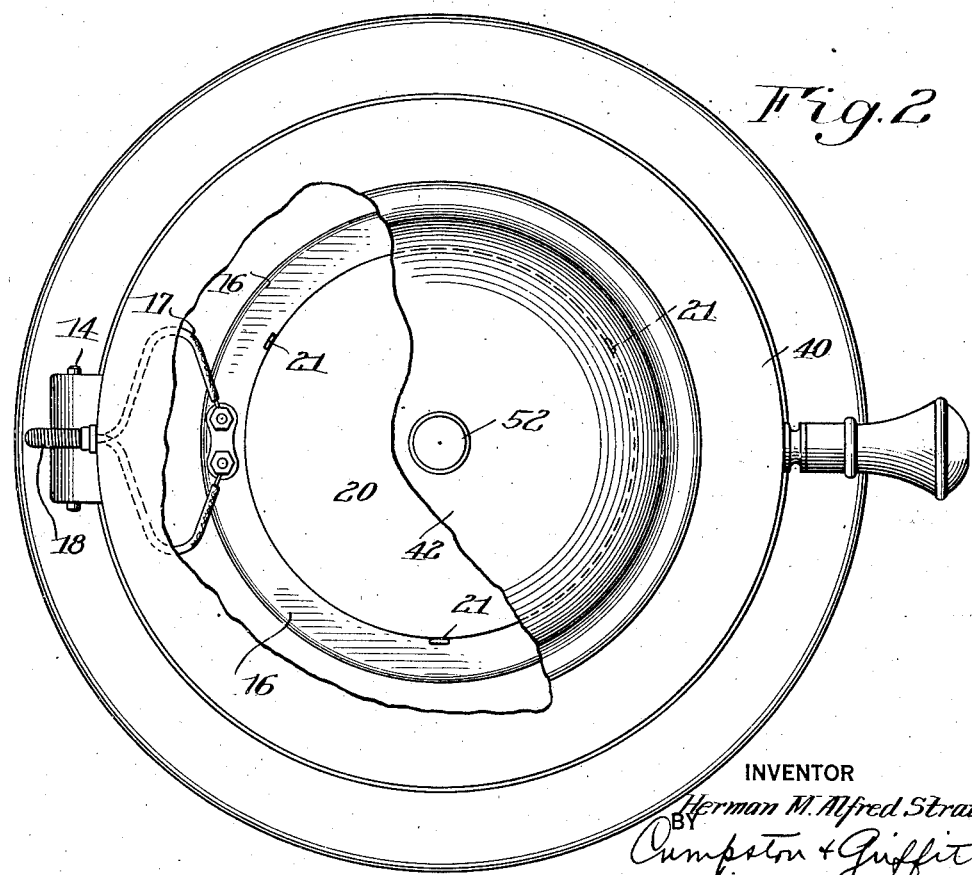
INVENTOR
Herman M. Alfred Strauss
BY Cumpston & Griffith
his ATTORNEYS

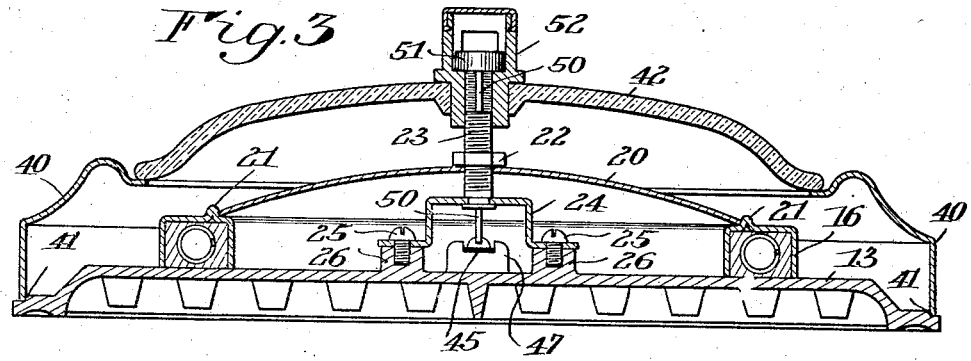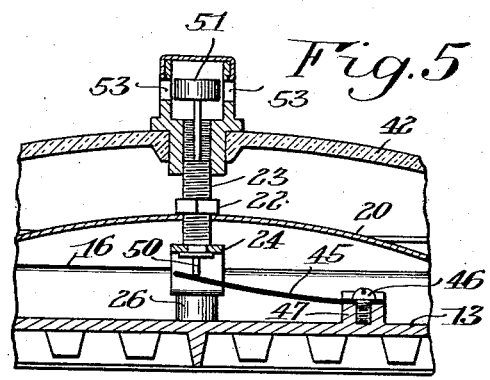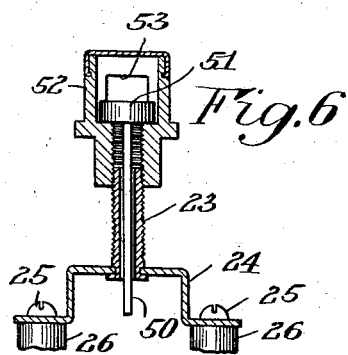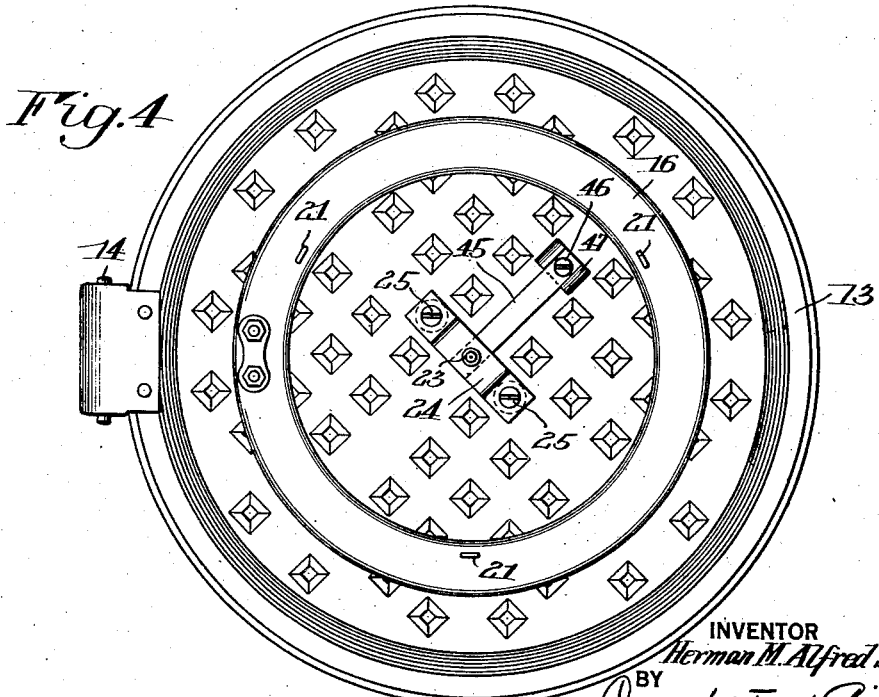

Patented June 17, 1930

1,764,908

UNITED STATES PATENT OFFICE

HERMAN M. ALFRED STRAUSS, OF ROCHESTER, NEW YORK, ASSIGNOR TO ROBESON-ROCHESTER CORPORATION, OF ROCHESTER, NEW YORK, A CORPORATION OF NEW YORK

WAFFLE IRON

Application filed July 18, 1929. Serial No. 379,292.

This invention relates to a waffle iron and has for one of its objects the provision of a generally improved, more satisfactory, and more attractive waffle iron than those heretofore known.

Another object of the invention is the provision of a waffle iron in combination with automatic thermostatic means for indicating when the waffle iron is heated to a predetermined temperature, such as the temperature required for satisfactory cooking.

Still another object is the provision of improved and simplified means for holding a heating element in position on a waffle iron grid.

A further object of the invention is the provision of simple and effective means for holding a casing in cooperative relation to the grid of the waffle iron.

To these and other ends the invention resides in certain improvements and combinations of parts, all as will be hereinafter more fully described, the novel features being pointed out in the claims at the end of the specification.

In the drawings:

Fig. 1 is a side elevation of a waffle iron constructed in accordance with a preferred embodiment of the invention, with parts broken away and parts in section;

Fig. 2 is a plan view of the same;

Fig. 3 is a vertical section taken substantially centrally through the upper grid of a waffle iron and associated parts;

Fig. 4 is a plan of the waffle iron with the casing and other parts removed to show the heating element and the thermostatic element;

Fig. 5 is a fragmentary vertical section similar to a portion of Fig. 3, the plane of the section being at right angles to the plane of Fig. 3, and Fig. 6 is a fragmentary vertical section showing details of the thermostatically controlled indicator and associated parts.

Similar reference numerals throughout the several views indicate the same parts.

Referring now to Figs. 1 and 2 of the drawings, there is shown a base 10 on which rests a lower casing 11 within which is received the lower grid 12 of a waffle iron. An upper grid 13 is hingedly connected to the lower grid by a hinge 14, so that the upper grid may be swung upwardly from the lower grid in order to insert batter or to remove a cooked waffle.

This waffle iron is preferably electrically heated, and is provided with an electric heating element 15 on the lower side of the lower grid 12 and another electric heating element 16 on the upper side or back of the upper grid 13. These heating elements are held in position on their respective grids by means described below. Electric conducting wires 17 lead through the armored cable 18 to supply current to the heating element 16.

The electric heating element 16 may be of annular form having a comparatively large central opening therethrough, as shown especially in Figs. 3 and 4. The element may be conveniently held in place on the grid by means of a retaining member such as the dished plate 20 spanning the central opening as shown in Fig. 3, the periphery of the plate 20 resting upon the top of the element 16 and engaging three or more lugs 21 formed on the element to prevent relative lateral movement between the element and the plate. The plate 20, in turn, is retained in position by a nut 22 screwed on a threaded hollow stud 23 passing through a hole at the center of the plate 20, the lower end of the stud being fixed to a stirrup member 24 secured by screws 25 to lugs 26 formed on the grid 13. It will be obvious from Fig. 3 that when the nut 22 is screwed down against the plate 20, it holds the latter in place and thus securely retains the heating element 16 in position on the back of the grid 13.

The lower heating element 15 may likewise be of annular form, and may be similarly held in place by a dished plate 30 (Fig. 1) retained by a nut 31 on a stud 32 screwed into a threaded opening in a lug 33 formed on the bottom of the lower grid 12. This stud 32 preferably extends downwardly through the bottom of the casing 11 and through the top of the base 10, a nut 34 threaded on the stud serving to retain the casing 11 on the base of the waffle iron, and to hold the casing 11 and the lower grid together.

It is found in practice that the upper grid of an electrically heated waffle iron is frequently cooler than the lower grid, because the heat radiates faster from the upper grid than from the lower one. In the usual prior waffle irons, the casing covering the upper grid is made substantially entirely of metal, which permits rapid radiation and loss of heat. In the present waffle iron, however, a substantial portion of the upper casing is made of non-metallic material which is a relatively poor conductor of heat, and thus the heat losses from the upper grid are reduced to such an extent that this grid remains at substantially the same temperature as the lower grid, so that the waffle is cooked uniformly on both sides.

For instance, the casing covering the upper grid and its heating element may comprise an annular rim 40 of metal, the outer periphery of which lies against the back of the grid 13 and engages a shoulder 41 on the grid to prevent lateral displacement, as shown in Fig. 3. The main portion of this upper casing comprises a non-metallic member 42 having a diameter slightly greater than the diameter of the opening in the annular rim 40, so that the outer periphery of the non-metallic member 42 may overlap and rest upon the inner periphery of the metallic rim 40, as shown. This member 42 may be made of any suitable non-metallic material having relatively low heat conductivity, and is preferably of ceramic material such as porcelain or the like. In addition to the usefulness of this construction in reducing heat losses, it is likewise of great advantage in making a waffle iron of more pleasing and attractive appearance, especially since various forms of decoration or ornamentation not practicable on metal may be applied easily to the ceramic member 42.

Users of waffle irons frequently find it difficult to determine when the waffle iron has been sufficiently heated so that it is ready for cooking. One of the principal objects of the present invention is to overcome this difficulty by providing an automatic heat responsive signal or indicator which will inform the user when the waffle iron is at the proper temperature.

To this end, a thermostatic element is mounted upon the upper grid 13 of the waffle iron. This thermostatic element comprises a bi-metallic strip 45, one end of which is secured by a screw 46 to a lug 47 on the grid 13, while the free end of the bi-metallic strip is positioned in the space beneath the stirrup member 24 and is freely movable up and down in this space in response to temperature variations which affect the strip in well known manner.

The indicating device comprises a stem 50 the lower end of which is over the thermostatic strip 45 near the free end thereof, the stem extending thence upwardly through the hollow stud 23 and being guided thereby. This stem is attached at its upper end to an indicating target 51 which is vertically movable within a central cavity of a member 52 which serves not only as a casing for the indicating device but also as a retaining means for the upper grid casing. This member 52 extends through an aperture at the center of the casing portion 42 and is threaded internally to screw upon the threads of the stud 23, as shown especially in Fig. 6. Thus the member 52 serves as a nut to hold the member 42 in place, and since this member 42 contacts with the annular rim portion 40 of the casing, the rim 40 is thus likewise held in position in cooperatve relation to the grid 13.

The member 52 surrounds the target 51 and is closed at its top, but it has one or more sight openings 53 through which the indicating target 51 may be observed when it is in alinement with these sight openings. Normally, when the waffle iron is cold, the free end of the thermostatic strip 45 is depressed so that the stem 50 and target 51 drop by gravity to their lowermost position, illustrated in Figs. 3 and 6. In this position, the target 51 is below the level of the sight openings 53, so that it is substantially invisible.

When the waffle iron has been heated to a predetermined temperature, preferably the correct temperature for cooking waffles, the free end of the thermostatic strip 45 rises and presses upwardly on the stem 50, raising the stem sufficiently to bring the target 51 into alinement with the sight openings 53, so that it may be readily observed through these openings. Preferably, the target 51 is made of a color contrasting conspicuously with the external color of the member 52. For instance, the member 52 may be nickel plated, while the target 51 may be bright red. Thus the user of the waffle iron may easily observe that the target has risen into alinement with the openings 53, and will thus know that the waffle iron has been heated to the proper temperature so that cooking of waffles may be commenced.

Should the waffle iron become too hot, as may sometimes happen when the current is left on for a considerable time without putting any batter in the waffle iron, then the thermostatic strip 45 will bend still more so that the free end thereof is raised still farther. This will raise the target 51 partially above the sight openings 53, and the user, observing this misplacement of the indicator, will know that the iron is too hot and that batter should not be put into it until it has somewhat cooled off.

From the foregoing description it will be seen that a waffle iron construction has been devised which notifies the user in a simple manner of the temperature conditions of the iron, and indicates specifically when the temperature is correct for cooking. Furthermore, the entire construction is simple and durable, and of but few parts. The member 52 serves not only as a nut for retaining the casing portions 40 and 42 in position, but also as a casing for the indicating device. The stud 23 has a triple function, serving partly to retain the heating element 16 in position, partly to retain the casing portions 40 and 42 in positon, and partly as a guide for portions of the indicating device. Thus the number of parts of the waffle iron has been reduced, resulting in a construction which may be produced more economically and assembled more quickly, and which is less likely to get out of order than other constructions having a greater number of parts.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. The combination with a waffle iron having a housing, of an indicator casing projecting above the top of said housing, an indicator within said casing having a target portion, a thermostatic element for moving said indicator to bring said target portion into predetermined position within said casing when the waffle iron is heated to a predetermined temperature, and sight openings on opposite sides of said casing so that said target when in said predetermined position may be observed from opposite sides of said waffle iron.

2. The combination with a waffle iron grid, of a casing covering said grid, said casing comprising a metallic rim and a nonmetallic central portion of substantial area, and means engaging said non-metallic portion for holding said portion in cooperative relation to said rim and for concomitantly holding said rim in cooperative relation to said grid.

3. The combination with a waffle iron grid, of a casing covering said grid, said casing comprising a metallic rim and a nonmetallic central portion of substantial area, and screw threaded means holding said non-metallic portion against said rim and concomitantly holding said rim in cooperative relation to said grid.

4. The combination with a waffle iron grid, of a casing covering said grid, hollow means engaging said casing for holding it in position, and a thermostatically controlled indicating device having a portion within said hollow means.

5. The combination with a waffle iron grid, of a casing covering said grid, said casing comprising a portion having an aperture therein, hollow screw threaded means secured to said grid and extending through said aperture for holding said casing portion in position, a thermostatic element, and indicating means including a stem passing through said hollow screw threaded means and cooperating with said thermostatic element for indicating when said grid is heated to a predetermined temperature.

6. In a waffle iron, the combination with a grid, of an electric heating element for heating said grid, a casing including a heat insulating portion of ceramic material overlying said grid and heating element, and a heat indicating device including a movable indicating member mounted on said ceramic portion for indicating the heat condition of the grid beneath said ceramic portion and a bimetallic heat responsive element for operating said movable indicating member.

7. In a waffle iron, the combination with a grid, of an electric heating element for heating said grid, a casing overlying said grid and heating element, said casing including a central heat insulating portion of porcelain and a metallic rim around said porcelain portion, said porcelain portion having an aperture therethrough substantially centrally thereof, and a heat indicating device including a part extending through and mounted in said aperture and a bi-metallic actuating element responsive to heat within said casing.

HERMAN M. ALFRED STRAUSS.